United States Patent
Liu et al.

(10) Patent No.: US 12,021,613 B2
(45) Date of Patent: Jun. 25, 2024

(54) TECHNIQUES AND APPARATUSES FOR AVOIDING COLLISIONS ON AN UPLINK DATA CHANNEL AND A CELL-SPECIFIC OR UE-SPECIFIC UPLINK CONTROL CHANNEL

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 926 days.

(21) Appl. No.: 16/824,971

(22) Filed: Mar. 20, 2020

(65) Prior Publication Data
US 2020/0220649 A1 Jul. 9, 2020

Related U.S. Application Data

(62) Division of application No. 16/130,877, filed on Sep. 13, 2018, now Pat. No. 11,863,315.
(Continued)

(51) Int. Cl.
*H04L 5/00* (2006.01)
*H04L 1/00* (2006.01)
(Continued)

(52) U.S. Cl.
CPC .......... *H04L 1/0013* (2013.01); *H04L 5/0055* (2013.01); *H04L 5/0064* (2013.01);
(Continued)

(58) Field of Classification Search
CPC ... H04L 1/0013; H04L 5/0055; H04L 5/0064; H04L 5/0007; H04L 5/0044; H04W 4/70; H04W 16/14; H04W 72/21
See application file for complete search history.

(56) References Cited

U.S. PATENT DOCUMENTS

| 8,830,947 | B2 | 9/2014 | Turtinen et al. |
| 10,075,949 | B2 | 9/2018 | Kuchibhotla et al. |
| | | (Continued) | |

FOREIGN PATENT DOCUMENTS

| CN | 104604177 A | 5/2015 |
| CN | 105850057 A | 8/2016 |
| | (Continued) | |

OTHER PUBLICATIONS

Ericsson: "Correction on UCI Multiplexing on Pusch", 3GPP Draft; 36213_CR0683R2_(REL-13)_R1-165791, 3rd Generation Partnership Project (3GPP), Mobile Competence Centre; 650, Route Des Lucioles; F-06921 Sophia-Antipolis Cedex; France, vol. RAN WG1, No. Nanjing. China; May 23, 2016-May 27, 2016 Jun. 12, 2016, XP051102668, Retrieved from the Internet: URL:http;ffwww.3gpp.org/ftp/Meetings_3GPP_SYNC/RAN/Docs/ [retrieved on Jun. 12, 2016], 5 pages.
(Continued)

*Primary Examiner* — Un C Cho
*Assistant Examiner* — Lalita W Pace
(74) *Attorney, Agent, or Firm* — Harrity & Harrity, LLP

(57) ABSTRACT

Some techniques and apparatuses described herein may be used to avoid or reduce collisions between uplink data communications and uplink control communications for an enhanced machine-type communication user equipment (eMTC UE) operating in an unlicensed radio frequency spectrum band. Furthermore, some techniques and apparatuses may avoid such collision while still allowing efficient use of resources, such as by deferring the uplink data communication within a data segment, rate matching an uplink data communication around uplink control resources (e.g., cell-specific uplink control resources and/or UE-specific uplink control resources), puncturing the uplink data communication to avoid the uplink control resources, mul-
(Continued)

tiplexing uplink control information on an uplink data channel, and/or the like.

29 Claims, 9 Drawing Sheets

Related U.S. Application Data

(60) Provisional application No. 62/594,361, filed on Dec. 4, 2017.

(51) Int. Cl.
*H04W 4/70* (2018.01)
*H04W 16/14* (2009.01)
*H04W 72/21* (2023.01)

(52) U.S. Cl.
CPC .............. *H04W 4/70* (2018.02); *H04W 16/14* (2013.01); *H04W 72/21* (2023.01); *H04L 5/0007* (2013.01); *H04L 5/0044* (2013.01)

(56) References Cited

U.S. PATENT DOCUMENTS

| | | |
|---|---|---|
| 2007/0014272 A1 | 1/2007 | Palanki et al. |
| 2010/0040009 A1 | 2/2010 | Gaal et al. |
| 2011/0093757 A1 | 4/2011 | Seol et al. |
| 2011/0274043 A1* | 11/2011 | Nam ................ H04L 5/0055 370/328 |
| 2013/0003627 A1 | 1/2013 | Kravtsov |
| 2013/0114391 A1* | 5/2013 | Jang ................ H04L 5/0053 370/203 |
| 2013/0121304 A1* | 5/2013 | Nory ................ H04L 5/0055 370/329 |
| 2014/0050205 A1 | 2/2014 | Ahn et al. |
| 2015/0181533 A1 | 6/2015 | Chen et al. |
| 2015/0181589 A1 | 6/2015 | Luo et al. |
| 2016/0037352 A1 | 2/2016 | Wei et al. |
| 2016/0073366 A1 | 3/2016 | Ng et al. |
| 2016/0094996 A1 | 3/2016 | Xiong et al. |
| 2016/0095114 A1 | 3/2016 | Kim et al. |
| 2016/0099799 A1 | 4/2016 | Bashar et al. |
| 2016/0119922 A1 | 4/2016 | Ye |
| 2016/0174213 A1 | 6/2016 | Webb et al. |
| 2016/0218836 A1* | 7/2016 | Yamamoto ............ H04L 1/1671 |
| 2016/0226649 A1* | 8/2016 | Papasakellariou .... H04L 1/0028 |
| 2016/0285595 A1 | 9/2016 | Chen et al. |
| 2016/0309510 A1* | 10/2016 | Wong ................ H04W 4/70 |
| 2016/0381674 A1 | 12/2016 | Kim et al. |
| 2017/0111901 A1 | 4/2017 | Chu |
| 2017/0223695 A1 | 8/2017 | Kwak et al. |
| 2017/0238190 A1 | 8/2017 | Yang et al. |
| 2017/0264399 A1 | 9/2017 | Li et al. |
| 2017/0273056 A1 | 9/2017 | Papasakellariou |
| 2017/0302419 A1 | 10/2017 | Liu et al. |
| 2017/0324528 A1 | 11/2017 | Rico Alvarino et al. |
| 2017/0325258 A1 | 11/2017 | Nogami et al. |
| 2017/0374675 A1 | 12/2017 | Hwang et al. |
| 2018/0035459 A1 | 2/2018 | Islam et al. |
| 2018/0132229 A1 | 5/2018 | Li |
| 2018/0191483 A1 | 7/2018 | Yamazaki et al. |
| 2019/0007182 A1* | 1/2019 | Li ........................ H04L 1/1854 |
| 2019/0173611 A1 | 6/2019 | Liu et al. |
| 2019/0280842 A1 | 9/2019 | Suzuki et al. |
| 2020/0245319 A1* | 7/2020 | Chen ................ H04L 5/0053 |
| 2020/0374917 A1* | 11/2020 | Takeda ............... H04L 5/0053 |
| 2022/0131643 A1* | 4/2022 | Park ................... H04L 1/0026 |

FOREIGN PATENT DOCUMENTS

| | | |
|---|---|---|
| CN | 107295662 A | 10/2017 |
| WO | 2016170425 A1 | 10/2016 |
| WO | 2017164626 A2 | 9/2017 |

OTHER PUBLICATIONS

Ericsson et al., "Collision between RACH Transmission and HARQ-ACK Repetition", 3GPP Draft; R1-124496 Collision between RACH Transmission and HARQ-ACK Repetition, 3rd Generation Partnership Project (3GPP), Mobile Competence Centre; 650, Route Des Lucioles; F-06921 Sophia-Antipolis Cedex; France, vol. RAN WG1, No. San Diego; USA; Oct. 8, 2012-Oct, 12, 2012 Sep. 29, 2012, XP050662374, Retrieved from the Internet: URL:http://www.3gpp.org/ftp/tsg_ran/WG1_RL1/TSGR1_70b/Docs/ [retrieved on Sep. 29, 2012], 2 pages.

International Search Report and Written Opinion—PCT/US2018/058951—ISA/EPO—dated Feb. 19, 2019.

VIVO: "Design of long-PUCCH over Multiple Slots", 3GPP Draft; R1-1717494 Design of long-PUCCH over Multiple Slots, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017 Oct. 8, 2017, XP051340682, Retrieved from the Internet: URL:http://www.3gpp.org/ftp/Meetings_3GPP_SYNC/RAN1/Docs/ [retrieved on Oct. 8, 2017], 4 pages.

Huawei, et al., "On UCI Multiplexing", 3GPP Draft, 3GPP TSG RAN WG1 Meeting #91, R1-1719397, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369306, 9 Page, page 1, 1 Introduction pp. 1-4, 2 UCI piggyback on PUSCH, the whole document.

LG Electronics: "Support of Uplink Channel Multiplexing for NR", 3GPP TSG RAN WG1 NR Ad-Hoc#2, R1-1710321, No. Qingdao, P. R. China, Jun. 27, 2017-Jun. 30, 2017, 7 Pages, Jun. 17, 2017.

Motorola Mobility et al., "Multiplexing of Uplink Channels with Different Transmission Durations", 3GPP TSG RAN WG1 #91, R1-1720927, No. Reno, USA, Nov. 27, 2017-Dec. 1, 2017, 3Pages, Nov. 18, 2017.

Samsung: "On Simultaneous PUSCH and PUCCH Transmissions", 3GPP TSG RAN WG1 NR ad-Hoc#2, R1-1710711, No. Qingdao, China, Jun. 27, 2017-Jun. 30, 2017, 3 Pages, Jun. 17, 2017.

Taiwan Search Report—TW107139144—TIPO—dated Nov. 14, 2021.

LG Electronics: "UCI on PUSCH and UL Channel Multiplexing for NR" [online], 3GPP Draft, 3GPP TSG RAN WG1 Meeting #91, R1-1719927, 3rd Generation Partnership Project (3GPP), vol. RAN WG1, No. Reno, USA, Nov. 27, 2017-Dec. 1, 2017, Nov. 18, 2017 (Nov. 18, 2017), XP051369640, 17 Pages, Retrieved from the Internet: URL: http://www.3gpp.org/ftp/tsg%5Fran/WG1%5FRL1/TSGR1%5F91/Docs/ [retrieved on Nov. 18, 2017].

SHARP: "Simultaneous PUCCH and PUSCH Transmission and Collision Handling", 3GPP TSG RAN WG1 NR#90bis Meeting, R1-1718418, Prague, Czech Republic, Oct. 9-13, 2017, 2 Pages.

* cited by examiner

TECHNIQUES AND APPARATUSES FOR AVOIDING COLLISIONS ON AN UPLINK DATA CHANNEL AND A CELL-SPECIFIC OR UE-SPECIFIC UPLINK CONTROL CHANNEL

CROSS-REFERENCE TO RELATED APPLICATIONS UNDER 35 U.S.C. § 119

This application is a divisional of U.S. patent application Ser. No. 16/130,877, filed Sep. 13, 2018, which claims priority to U.S. Provisional Patent Application No. 62/594,361, filed on Dec. 4, 2017, which are hereby expressly incorporated by reference herein.

BACKGROUND

Field

Aspects of the present disclosure generally relate to wireless communication, and more particularly to techniques and apparatuses for avoiding collisions on an uplink data channel and a cell-specific or user equipment (UE)-specific uplink control channel.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In some aspects, an enhanced machine-type communication user equipment operating in an unlicensed radio frequency (RF) spectrum band (eMTC-u UE) may be configured to repeat uplink data transmissions on an uplink data channel (e.g., a physical uplink shared channel (PUSCH)) due to poor channel conditions, a location of the eMTC-u UE near a cell edge, and/or the like. This may increase a likelihood of collisions between a scheduled uplink control channel instance (e.g., a cell-specific PUCCH and/or a UE-specific PUCCH) and an uplink data communication scheduled for the eMTC-u UE on an uplink data channel.

Some techniques and apparatuses described herein may be used to avoid or reduce collisions between uplink data communications and uplink control communications for an eMTC-u UE operating in an unlicensed RF spectrum band. Furthermore, some techniques and apparatuses may avoid such collision while still allowing efficient use of resources, such as by deferring the uplink data communication within a data segment, rate matching an uplink data communication around uplink control resources (e.g., cell-specific uplink control resources and/or UE-specific uplink control resources), puncturing the uplink data communication to avoid the uplink control resources, multiplexing uplink control information on an uplink data channel, and/or the like.

In an aspect of the disclosure, a method, a user equipment (UE), an apparatus, and a computer program product are provided.

In some aspects, the method may be performed by a UE. The method may include determining one or more first resource elements to be used for a cell-specific uplink control channel associated with acknowledging or negatively acknowledging initial network setup messages in an unlicensed radio frequency spectrum band; determining that the one or more first resource elements are scheduled to collide with one or more second resource elements scheduled for the UE for an uplink data transmission on an uplink data channel, wherein the uplink data transmission includes an initial uplink data transmission and one or more repetitions of the initial uplink data transmission; and modifying the uplink data transmission based at least in part on determining that the one or more first resource elements are scheduled to collide with the one or more second resource elements.

In some aspects, the method may be performed by a UE. The method may include determining one or more first resource elements to be used for a UE-specific uplink control channel associated with acknowledging or negatively acknowledging, by the UE, downlink data communications in an unlicensed radio frequency spectrum band; determining that the one or more first resource elements are scheduled to collide with one or more second resource elements scheduled for the UE for an uplink data transmission on an uplink data channel, wherein the uplink data transmission includes an initial uplink data transmission and one or more repetitions of the initial uplink data transmission; and deferring transmission of the uplink data transmission on the uplink data channel or multiplexing uplink control information (UCI) on the one or more second resource elements of the uplink data channel based at least in part on determining that the one or more first resource elements are scheduled to collide with the one or more second resource elements.

In some aspects, the UE may include a memory and one or more processors operatively coupled to the memory. The memory and the one or more processors may be configured to determine one or more first resource elements to be used for a cell-specific uplink control channel associated with acknowledging or negatively acknowledging initial network setup messages in an unlicensed radio frequency spectrum band; determine that the one or more first resource elements are scheduled to collide with one or more second resource elements scheduled for the UE for an uplink data transmission on an uplink data channel, wherein the uplink data transmission includes an initial uplink data transmission and one or more repetitions of the initial uplink data transmission; and modify the uplink data transmission based at least in part on determining that the one or more first resource elements are scheduled to collide with the one or more second resource elements.

In some aspects, the UE may include a memory and one or more processors operatively coupled to the memory. The memory and the one or more processors may be configured to determine one or more first resource elements to be used for a UE-specific uplink control channel associated with acknowledging or negatively acknowledging, by the UE, downlink data communications in an unlicensed radio frequency spectrum band; determine that the one or more first resource elements are scheduled to collide with one or more second resource elements scheduled for the UE for an uplink data transmission on an uplink data channel, wherein the uplink data transmission includes an initial uplink data transmission and one or more repetitions of the initial uplink data transmission; and defer transmission of the uplink data transmission on the uplink data channel or multiplex uplink control information (UCI) on the one or more second resource elements of the uplink data channel based at least in part on determining that the one or more first resource elements are scheduled to collide with the one or more second resource elements.

In some aspects, the apparatus may include means for determining one or more first resource elements to be used for a cell-specific uplink control channel associated with acknowledging or negatively acknowledging initial network setup messages in an unlicensed radio frequency spectrum band; means for determining that the one or more first resource elements are scheduled to collide with one or more second resource elements scheduled for the apparatus for an uplink data transmission on an uplink data channel, wherein the uplink data transmission includes an initial uplink data transmission and one or more repetitions of the initial uplink data transmission; and means for modifying the uplink data transmission based at least in part on determining that the one or more first resource elements are scheduled to collide with the one or more second resource elements.

In some aspects, the apparatus may include means for determining one or more first resource elements to be used for a UE-specific uplink control channel associated with acknowledging or negatively acknowledging, by the apparatus, downlink data communications in an unlicensed radio frequency spectrum band; means for determining that the one or more first resource elements are scheduled to collide with one or more second resource elements scheduled for the apparatus for an uplink data transmission on an uplink data channel, wherein the uplink data transmission includes an initial uplink data transmission and one or more repetitions of the initial uplink data transmission; and means for deferring transmission of the uplink data transmission on the uplink data channel or multiplexing uplink control information (UCI) on the one or more second resource elements of the uplink data channel based at least in part on determining that the one or more first resource elements are scheduled to collide with the one or more second resource elements.

In some aspects, the computer program product may include a non-transitory computer-readable medium storing one or more instructions. The one or more instructions, when executed by one or more processors of a UE, may cause the one or more processors to determine one or more first resource elements to be used for a cell-specific uplink control channel associated with acknowledging or negatively acknowledging initial network setup messages in an unlicensed radio frequency spectrum band; determine that the one or more first resource elements are scheduled to collide with one or more second resource elements scheduled for the UE for an uplink data transmission on an uplink data channel, wherein the uplink data transmission includes an initial uplink data transmission and one or more repetitions of the initial uplink data transmission; and modify the uplink data transmission based at least in part on determining that the one or more first resource elements are scheduled to collide with the one or more second resource elements.

In some aspects, the computer program product may include a non-transitory computer-readable medium storing one or more instructions. The one or more instructions, when executed by one or more processors of a UE, may cause the one or more processors to determine one or more first resource elements to be used for a UE-specific uplink control channel associated with acknowledging or negatively acknowledging, by the UE, downlink data communications in an unlicensed radio frequency spectrum band; determine that the one or more first resource elements are scheduled to collide with one or more second resource elements scheduled for the UE for an uplink data transmission on an uplink data channel, wherein the uplink data transmission includes an initial uplink data transmission and one or more repetitions of the initial uplink data transmission; and defer transmission of the uplink data transmission on the uplink data channel or multiplex uplink control information (UCI) on the one or more second resource elements of the uplink data channel based at least in part on determining that the one or more first resource elements are scheduled to collide with the one or more second resource elements.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
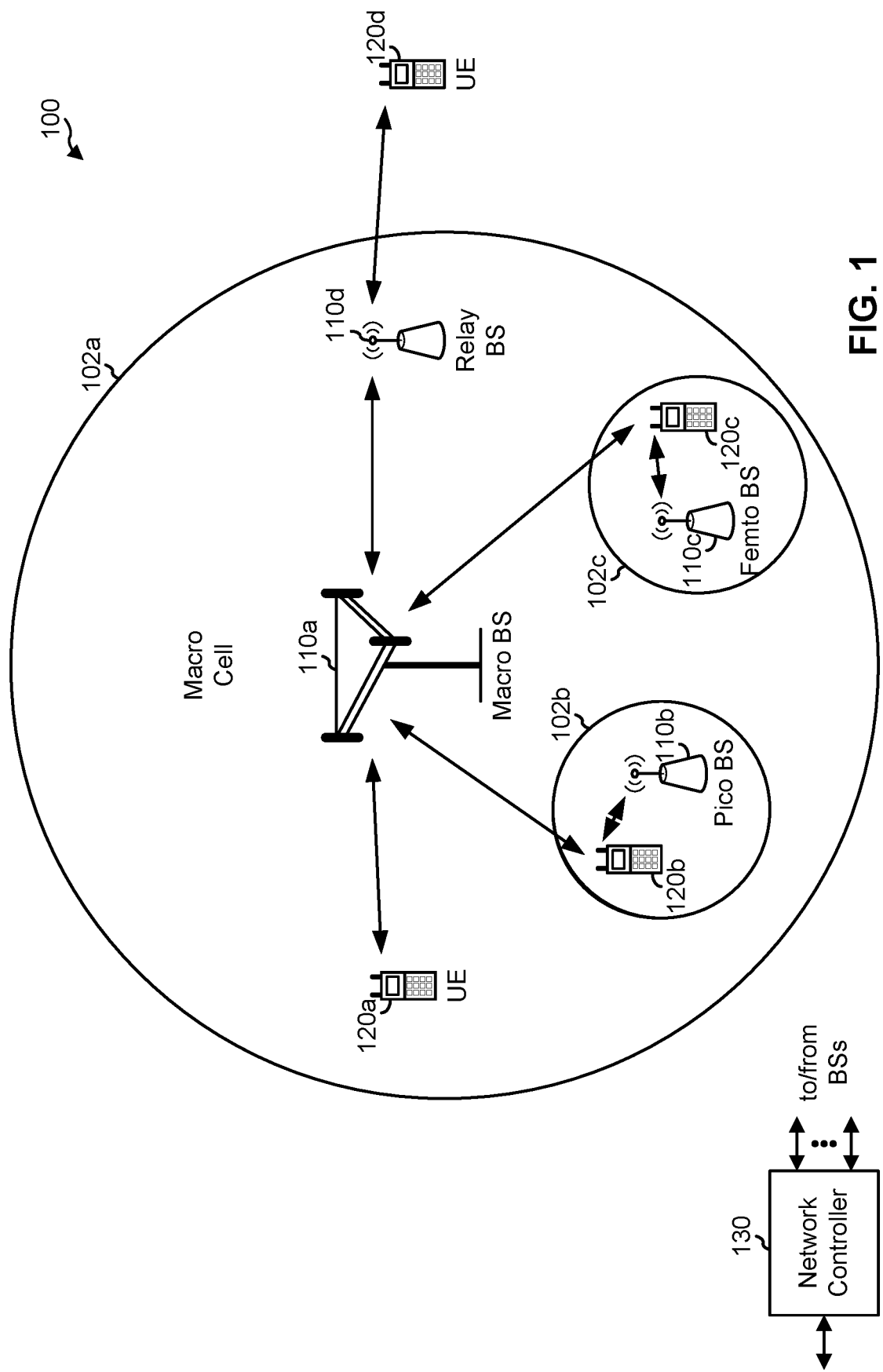
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE 120 may be stationary or mobile. A UE 120 may also be referred to as an access terminal, a terminal, a mobile station, a subscriber unit, a station, etc. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs 120 may be considered Internet-of-Things (IoT) devices, and/or may be implemented as may be implemented as NB-IoT (narrowband internet of things) devices. Some UEs 120 may be considered a Customer Premises Equipment (CPE). UE 120 may be included inside a housing that houses components of UE 120, such as processor components, memory components, and/or the like.

In some aspects, a UE 120 may be an MTC UE and/or an eMTC UE that operates in an unlicensed radio frequency (RF) spectrum band. In some aspects, an eMTC UE that operates in an unlicensed RF spectrum band may be referred to as an eMTC-u UE. UEs 120 and base stations 110 may communicate over an unlicensed RF spectrum band using one or more radio access technologies, such as a Wi-Fi radio access technology, an LTE radio access technology, a 5G radio access technology, and/or the like. An unlicensed RF spectrum band may refer to an RF spectrum band that is open for shared use by any device that complies with regulatory agency rules for communicating via the RF spectrum band. In contrast with most licensed RF spectrum band usage, users of unlicensed RF spectrum bands do not typically have regulatory protection against radio interference from devices of other users. For example, devices that use the unlicensed RF spectrum band must typically accept any radio interference caused by other devices that use the unlicensed RF spectrum band. Because the unlicensed RF spectrum band may be shared by devices operating under different protocols (e.g., different RATs), transmitting devices may contend for access to the unlicensed RF spectrum band (e.g., using a listen before talk procedure and/or the like).

In some aspects, the unlicensed RF spectrum band may include one or more radio frequencies (e.g., one or more RF spectrum bands) included in the radio spectrum (e.g., the portion of the electromagnetic spectrum corresponding to radio frequencies, or frequencies lower than approximately 300 gigahertz (GHz)). In some aspects, the unlicensed RF spectrum band may include one or more RF spectrum bands that are open for shared use by any device that complies with regulatory agency rules (e.g., associated with a particular country) for communicating via the one or more RF spectrum bands. In some aspects, the unlicensed RF spectrum band may include one or more radio frequencies in the 2.4 GHz band. For example, the unlicensed RF spectrum band may include one or more radio frequencies between approximately 2.4 GHz and 2.48 GHz. Additionally, or alternatively, the unlicensed RF spectrum band may include one or more radio frequencies in the 5 GHz band. For example, the unlicensed RF spectrum band may include one or more radio frequencies between approximately 5.15 GHz and approximately 5.825 GHz.

The unlicensed RF spectrum band may be divided into channels via which RF communications may be transmitted. In some aspects, the unlicensed RF spectrum band may include one or more channels of approximately 1.4 MHz bandwidth (e.g., up to 59 channels at 1.4 MHz bandwidth in the 2.4 GHz band). Additionally, or alternatively, the unlicensed RF spectrum band may include one or more channels of approximately 20 MHz bandwidth. Wireless devices may communicate via a channel included in the unlicensed RF spectrum band. For example, a wireless device may communicate via an RF channel using a Wi-Fi radio access technology, an LTE radio access technology, a 5G radio access technology, and/or the like. In some aspects, a UE 120 may contend for access to the unlicensed RF spectrum band before sending a transmission via the unlicensed RF spectrum band.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported, and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

As indicated above, FIG. 1 is provided merely as an example. Other examples are possible and may differ from what was described with regard to FIG. 1.

Figure 2:
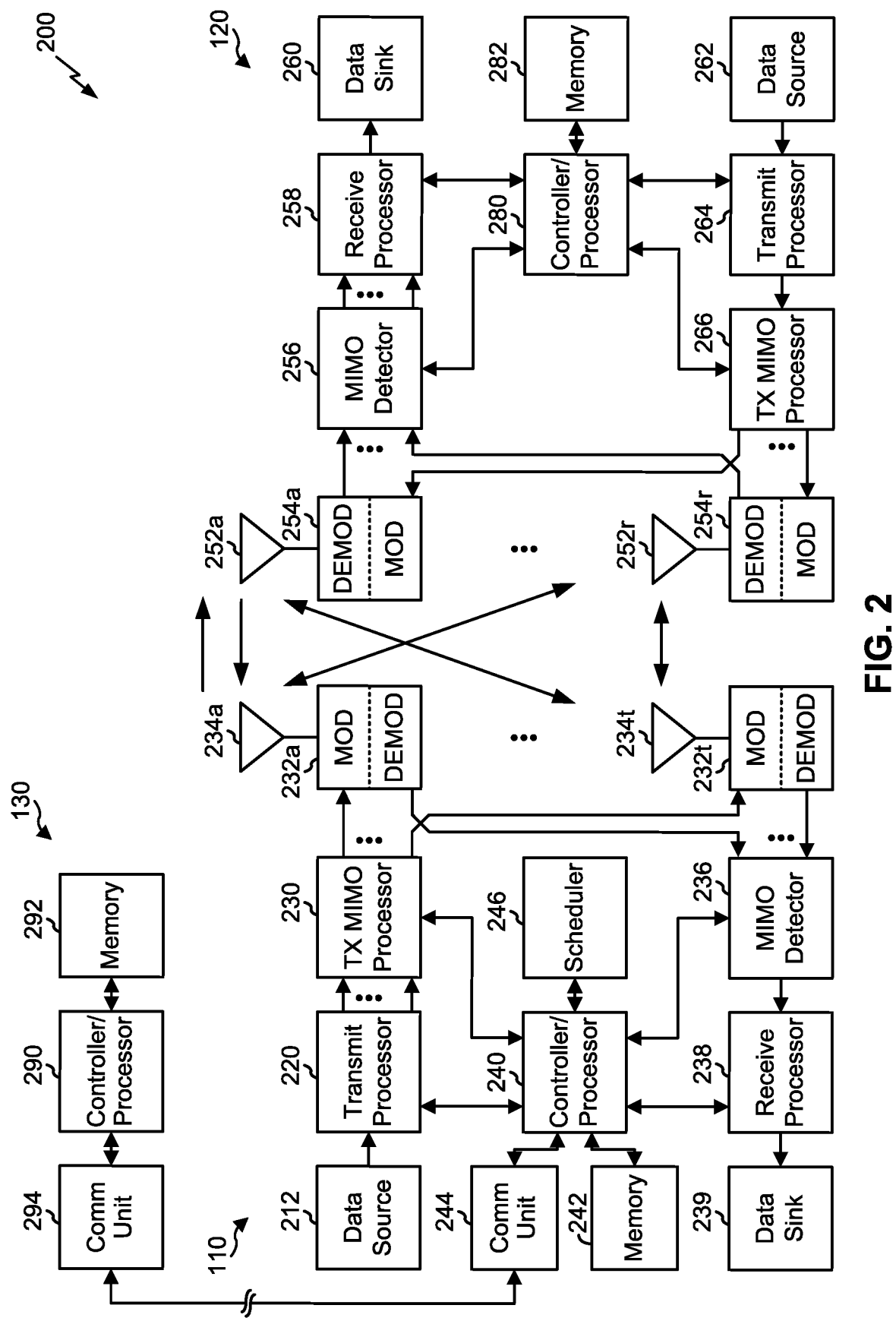
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with avoiding collisions on an uplink data channel and a cell-specific or UE-specific uplink control channel, as described in more detail elsewhere herein. For example, controller/processor 240 of base station 110, controller/processor 280 of UE 120, and/or any other component(s) of FIG. 2 may perform or direct operations of, for example, method 600 of FIG. 6, method 700 of FIG. 7, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
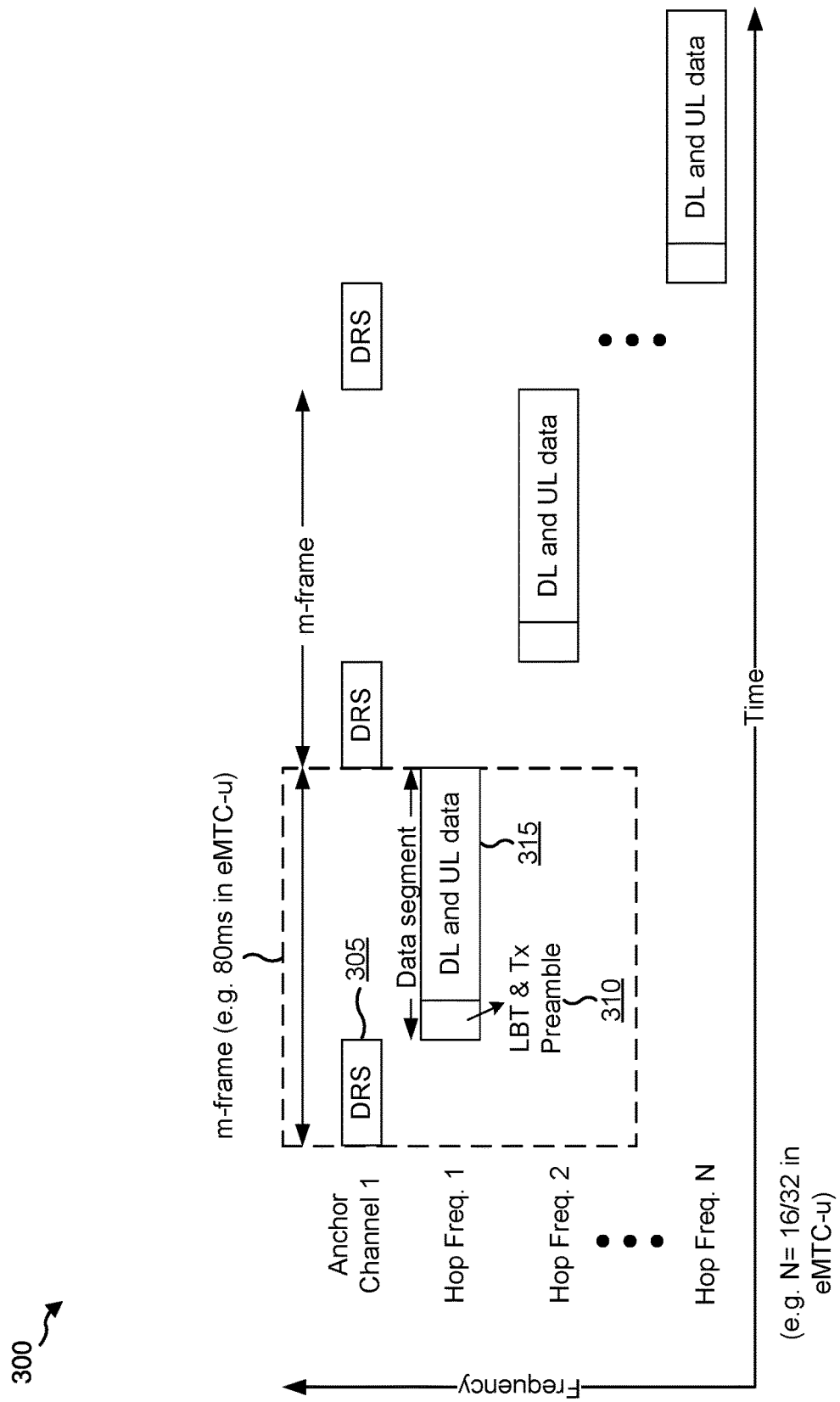
FIG. 3 is a diagram illustrating an example wireless communication mode for an enhanced machine-type communication (eMTC) UE operating in an unlicensed radio frequency spectrum band.

FIG. 3 is a diagram illustrating an example 300 of a wireless communication mode for an enhanced machine-type communication (eMTC) UE operating in an unlicensed radio frequency spectrum band.

As shown in FIG. 3, an eMTC UE 120 that communicates using an unlicensed RF spectrum band (e.g., which may be referred to as an eMTC-u UE 120) may operate in a frequency hopping mode. In the frequency hopping mode, the time domain may be divided into frames (e.g., shown as m-frames) of, for example, 80 milliseconds (ms). The eMTC-u UE 120 may communicate using different hopping frequencies in different frames. For example, the eMTC-u UE 120 may communicate using a first hopping frequency in a first frame, may communicate using a second hopping frequency in a second frame, may communicate using an $N^{th}$ hopping frequency in an $N^{th}$ frame (e.g., where N equals 16, 32, and/or the like), and may communicate again using the first hopping frequency in frame N+1. In this way, congestion on a particular hopping frequency may be reduced, and the eMTC-u UE 120 may increase the likelihood of finding a clear channel for communication.

As shown by reference number 305, at the beginning of a frame, the eMTC-u UE 120 may tune to an anchor channel to receive a discovery reference signal (DRS), which may include configuration parameters for communicating using the unlicensed RF spectrum band, such as a primary synchronization signal (PSS), a secondary synchronization signal (SSS), a physical broadcast channel (PBCH) communication, an indication of channels for frequency hopping, and/or the like. After obtaining the configuration parameters, the eMTC-u UE 120 may tune to a hopping frequency to receive downlink communications and/or to transmit uplink communications during a data segment.

As shown by reference number 310, at the beginning of the data segment, the eMTC-u UE 120 may perform a listen before talk (LBT) procedure to contend for access to a channel (e.g., a hopping frequency) of the unlicensed RF spectrum band and/or may transmit a preamble (e.g., a Tx preamble, a Wi-Fi preamble, and/or the like) to indicate that the eMTC-u UE 120 is accessing the channel. In some aspects, the LBT procedure may include performing a clear channel assessment (CCA) procedure to determine whether the channel is available. The CCA procedure may include detecting an energy level on the channel (e.g., an energy level of Tx preambles transmitted by other devices via the channel, such as Wi-Fi preambles) and determining whether the energy level satisfies a threshold. When the energy level satisfies the threshold (e.g., is less than or equal to the threshold), the eMTC-u UE 120 may access the channel to transmit and/or receive communications. When the energy level does not satisfy the threshold (e.g., is greater than or equal to the threshold), the channel may not be available for access by the eMTC-u UE 120, and the eMTC-u UE 120 may perform the CCA procedure for the channel again at a later time. In some aspects, the eMTC-u UE 120 may transmit a preamble via the channel, prior to transmitting and/or receiving communications via the channel, to assist other devices with determining whether the channel is available (e.g., when the other devices are performing an LBT procedure).

As shown by reference number 315, once the eMTC-u UE 120 accesses the hopping frequency, the eMTC-u UE 120 may receive downlink communications and/or may transmit uplink communications during the data segment. The communications during the data segment may include data communications and/or control communications associated with the data communications (e.g., acknowledgement or negative acknowledgment (ACK/NACK) indications for the data communications). In some aspects, the data segment may be divided into a long burst of downlink subframes followed by a long burst of uplink subframes to reduce switching between downlink and uplink. In some aspects, the long burst of downlink subframes may be referred to as a downlink segment of the data segment, and the long burst of uplink subframes may be referred to as an uplink segment of the data segment. The eMTC-u UE 120 may receive one or more downlink communications during the downlink segment and/or may transmit one or more uplink communications during the uplink segment.

According to some unlicensed RF spectrum standards (e.g., regulations regarding the 2.4 GHz RF spectrum band promulgated by the European Telecommunications Standards Institute (ETSI)), within an uplink segment of a frame, an eMTC-u UE 120 is permitted to transmit an uplink communication for only 5 contiguous milliseconds, after which the eMTC-u UE 120 must wait 5 milliseconds (e.g., a 5 ms transmission gap) before another uplink transmission. In this way, the eMTC-u UE 120 may permit other devices to communicate during the transmission gap.

Because of these uplink limitations, as well as the contentious nature of the unlicensed RF spectrum band, a base station 110 and an eMTC-u UE 120 communicating in the unlicensed RF spectrum band use an asynchronous hybrid automatic repeat request (HARQ) procedure. In an asynchronous HARQ procedure, ACK/NACK indications are transmitted according to a dynamic or semi-static timeline (e.g., a timing between when a downlink data communication is received by the eMTC-u UE 120 and a corresponding ACK/NACK indication is transmitted by the eMTC-u UE 120), rather than a fixed timeline. In this case, the eMTC-u UE 120 may transmit an ACK/NACK indication using a bitmap that corresponds to a number of HARQ processes (e.g., downlink data communications) to be acknowledged or negatively acknowledged.

The base station 110 may configure uplink control channel (e.g., physical uplink control channel (PUCCH)) instances for transmission of these ACK/NACK indications by the eMTC-u UE 120. The uplink control channel instances may be configured for different uplink control channel formats (e.g., PUCCH format 1, format 1a, format 2, format 2a, and/or the like), and may be configured with different resource block (RB) allocations of the data segment, different periodicities across data segments and/or frames, different offsets within the data segment, different transmission windows, different resource element (REs) for transmission of an ACK/NACK indication and/or other uplink control information (UCI) (e.g., channel state information (CSI), a scheduling request (SR), and/or the like), and/or other configuration parameters.

In some aspects, the base station 110 may use a cell-specific uplink control channel configuration for initial network setup for a group of eMTC-u UEs 120 that are not connected to the base station 110, and may use a UE-specific uplink control channel configuration for individual eMTC-u UEs 120 that are connected to the base station 110. For example, the base station 110 may indicate (e.g., in a system information block (SIB)) a cell-specific uplink control channel (e.g., a cell-specific PUCCH) configuration for eMTC-u UEs 120 that are not connected to the base station 110. The cell-specific uplink control channel may be used by an eMTC-u UE 120 for acknowledging or negatively acknowledging initial network setup messages, such as for a random access channel (RACH) procedure, may be common across all eMTC-u UEs 120 for initial access to a cell, and may be known or discoverable by all eMTC-u UEs 120 in the cell (e.g., UEs 120 that are RRC connected and UEs 120 that are not RRC connected).

Additionally, or alternatively, the base station 110 may indicate (e.g., in an RRC configuration message) a UE-specific uplink control channel (e.g., a UE-specific PUCCH) for each eMTC-u UE 120 connected to the base station 110. The UE-specific uplink control channel may be used by an eMTC-u UE 120, after being RRC connected to the base station 110, for acknowledging or negatively acknowledging downlink data communications in the data segment. An eMTC-u UE 120 that is RRC connected to the base station 110 may perform one or more collision avoidance techniques to avoid uplink data communication collisions with both the cell-specific uplink control channel (e.g., transmissions by other eMTC-u UEs 120) and the UE-specific uplink control channel (e.g., transmission by the eMTC-u UE 120), as described in more detail elsewhere herein.

In some aspects, an eMTC-u UE 120 may be configured to repeat uplink data transmissions on an uplink data channel (e.g., a physical uplink shared channel (PUSCH)) due to poor channel conditions, a location of the eMTC-u UE 120 near a cell edge, and/or the like. This may increase a likelihood of collisions between a scheduled uplink control channel instance (e.g., a cell-specific PUCCH and/or a UE-specific PUCCH) and an uplink data communication scheduled for the eMTC-u UE 120 on an uplink data channel. To avoid a collision, the eMTC-u UE 120 may avoid transmitting an uplink data communication on RBs scheduled for the uplink control channel across all subframes or repetitions of the uplink data channel. However, this may waste resources when the uplink control channel is scheduled on fewer than all subframes or repetitions. Additionally, or alternatively, the UE may drop the uplink data communication to avoid a collision with the uplink control channel. However, this may result in a long delay before another opportunity to transmit the uplink data communication due to uplink limitations, data segment design, and contention for access associated with the unlicensed RF spectrum band.

Some techniques and apparatuses described herein may be used to avoid or reduce collisions between uplink data communications and uplink control communications for an eMTC-u UE 120 operating in an unlicensed RF spectrum band. Furthermore, some techniques and apparatuses may avoid such a collision while still allowing efficient use of resources, such as by deferring an uplink data communication within a data segment, rate matching an uplink data communication around uplink control resources (e.g., cell-specific uplink control resources and/or UE-specific uplink control resources), puncturing the uplink data communication to avoid the uplink control resources, multiplexing uplink control information on an uplink data channel, and/or the like.

As indicated above, FIG. 3 is provided as an example. Other examples are possible and may differ from what was described with respect to FIG. 3.

Figure 4:
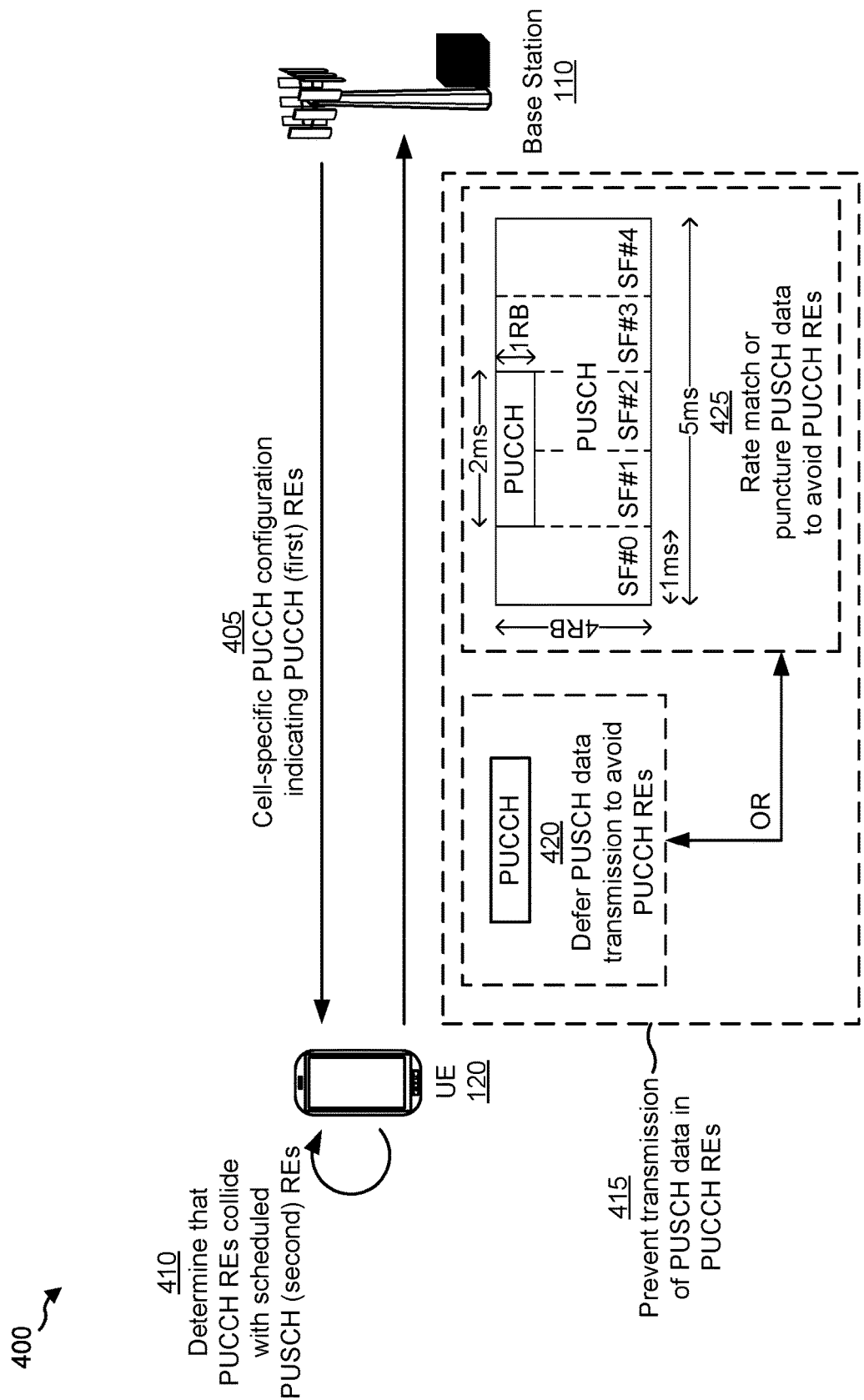
FIGS. 4 and 5 are diagrams illustrating examples of avoiding collisions on an uplink data channel and a cell-specific or UE-specific uplink control channel.

FIG. 4 is a diagram illustrating an example 400 of avoiding collisions on an uplink data channel and a cell-specific uplink control channel.

As shown by reference number 405, a UE 120 (e.g., an eMTC-u UE 120) may determine one or more first resource elements (REs) to be used for a cell-specific uplink control channel (e.g., shown as a cell-specific PUCCH as an example). For example, the UE 120 may receive, from a base station 110, an indication of a cell-specific uplink control channel configuration that indicates the one or more first REs to be used for the cell-specific uplink control channel. As used herein, the term uplink control channel may include a PUCCH. In some aspects, a PUCCH may be a specific type of uplink control channel.

As described above in connection with FIG. 3, in some aspects, the cell-specific uplink control channel may be used by eMTC-u UEs 120, that are not connected to the base station 110 (e.g., that are not connected via an RRC connection), for acknowledging or negatively acknowledging initial network setup messages, such as for a RACH procedure. Additionally, or alternatively, the cell-specific uplink control channel configuration may be common across all eMTC-u UEs 120 in a cell. In some aspects, the cell-specific uplink control channel configuration may be signaled in a system information block (SIB). Additionally, or alternatively, the cell-specific uplink control channel configuration may be signaled in a group common uplink control channel (e.g., a group common PUCCH) that is accessible by multiple UEs 120.

As shown by reference number 410, the UE 120 may determine that the one or more first REs (e.g., of the cell-specific PUCCH) collide with one or more second REs scheduled for the UE 120 on an uplink data channel (e.g., a PUSCH). For example, the UE 120 may receive a downlink grant, from the base station 110, that indicates the one or more second REs scheduled for an uplink data communication (e.g., an initial uplink data communication and/or one or more repetitions of the initial uplink data communication). In some aspects, the downlink grant may indicate a number of repetitions for the uplink data communication. Additionally, or alternatively, the number of repetitions may be indicated in an RRC configuration message. As used herein, the term uplink data channel may include a PUSCH. In some aspects, a PUSCH may be a specific type of uplink data channel.

The UE 120 may compare the one or more first REs and the one or more second REs to determine whether there is any overlap between the two sets of REs. If there is overlap, then the UE 120 may determine that the two sets of REs collide, and may employ one or more collision avoidance techniques, as described below.

As shown by reference number 415, the UE 120 may prevent transmission of an uplink data transmission using the one or more first REs (e.g., reserved for the PUCCH) based at least in part on determining that the one or more first REs collide with the one or more second REs. For example, the UE 120 may prevent a collision by deferring the uplink data transmission, by rate matching the uplink data transmission around the one or more first REs, by puncturing the uplink data transmission to avoid the one or more first REs, and/or the like. In some aspects, the uplink data transmission may include an initial uplink data transmission and/or one or more repetitions of the initial uplink data transmission.

As shown by reference number 420, in some aspects, the UE 120 may defer the uplink data transmission to avoid transmitting uplink data in the one or more first REs used for the cell-specific PUCCH. In this way, other UEs 120 may communicate with the base station 110 (e.g., to ACK or NACK initial network setup messages) during the REs scheduled for the cell-specific PUCCH. In some aspects, the UE 120 may defer the uplink data transmission within a data segment of a frame. For example, the UE 120 may defer the uplink data transmission if the UE 120 determines that there are sufficient remaining uplink segments (e.g., a threshold number of remaining uplink subframes), within a data segment, to permit transmission of the uplink data within the data segment. In some aspects, the UE 120 may account for uplink limitations (e.g., a limit on contiguous uplink transmissions, a required transmission gap, and/or the like) when determining whether there are sufficient remaining uplink segments, within the data segment, for transmission of the uplink data. In this way, the UE 120 may prevent transmission of the uplink data from being delayed to a subsequent frame.

As shown by reference number 425, in some aspects, the UE 120 may rate match the uplink data transmission around the one or more first REs to avoid transmitting uplink data in the one or more first REs used for the cell-specific PUCCH. Additionally, or alternatively, the UE 120 may puncture the uplink data transmission to avoid transmitting uplink data in the one or more first REs used for the cell-specific PUCCH. In some aspects, the UE 120 may rate match or puncture the uplink data transmission to avoid the one or more first REs based at least in part on a determination that there are not sufficient remaining uplink segments (e.g., a threshold number of remaining uplink subframes), within a data segment, to permit transmission of the uplink data within the data segment, in a similar manner as described above. For example, the UE 120 may defer the uplink data transmission when a number of subsequent uplink segments (e.g., that occur after the one or more second REs) in a data segment or a frame satisfies a threshold (e.g., is greater than or equal to a threshold), and may rate match or puncture the uplink data transmission when a number of subsequent uplink segments in the data segment or the frame does not satisfy a threshold (e.g., is less than or equal to a threshold). In this way, the UE 120 may avoid delaying transmission of the uplink data, and may increase the efficiency of network resource usage.

In some aspects, the UE 120 may receive, from the base station 110, an indication of whether to defer the uplink data transmission or rate match or puncture the uplink data transmission to avoid the one or more second REs. For example, the base station 110 may determine whether the base station 110 will be able to schedule the uplink data transmission in one or more subsequent uplink subframes of the same data segment, and may signal a collision avoidance technique to be used by the UE 120 based at least in part on this determination, in a similar manner as described above. In some aspects, the UE 120 may defer the uplink data transmission within the data segment based at least in part on receiving an indication to defer the uplink data transmission. Additionally, or alternatively, the UE 120 may rate match or puncture the uplink data transmission around the one or more first REs based at least in part on receiving an indication to rate match or puncture the uplink data transmission. In this way, a collision avoidance technique may be flexibly configured to account for dynamic network conditions.

As indicated above, FIG. 4 is provided as an example. Other examples are possible and may differ from what was described with respect to FIG. 4.

Figure 5:
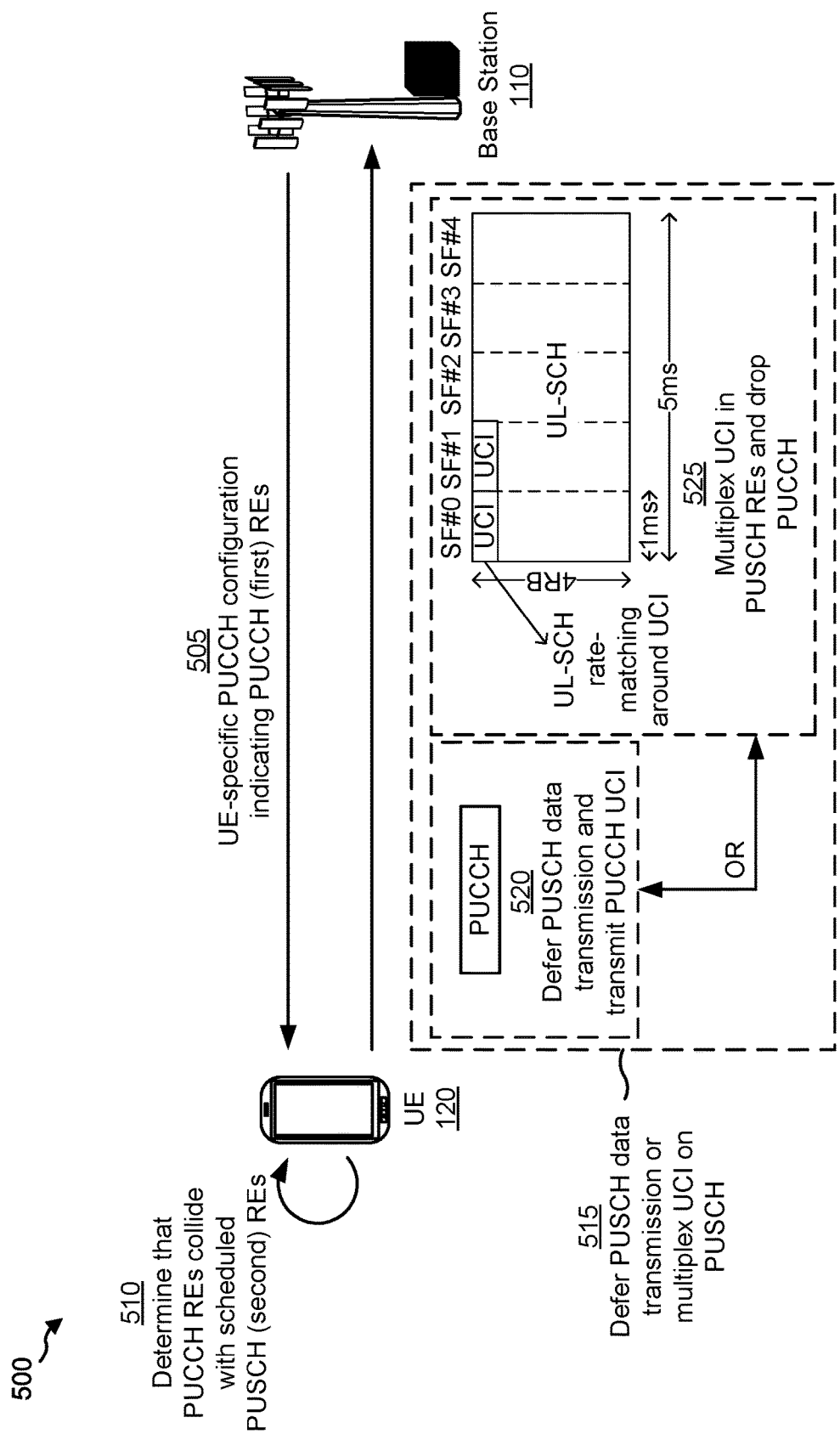

FIG. 5 is a diagram illustrating an example 500 of avoiding collisions on an uplink data channel and a UE-specific uplink control channel.

As shown by reference number 505, a UE 120 (e.g., an eMTC-u UE 120) may determine one or more first resource elements (REs) to be used for a UE-specific uplink control channel (e.g., shown as a UE-specific PUCCH as an example). For example, the UE 120 may receive, from a base station 110, an indication of a UE-specific uplink control channel configuration that indicates the one or more first REs to be used for the UE-specific uplink control channel.

As described above in connection with FIG. 3, in some aspects, the UE-specific uplink control channel may be used by an eMTC-u UE 120, that is connected to the base station 110 (e.g., via an RRC connection), for acknowledging or negatively acknowledging downlink data communications (e.g., received in a data segment). Additionally, or alternatively, the UE-specific uplink control channel configuration may be different for different eMTC-u UEs 120 in a cell. In some aspects, the UE-specific uplink control channel configuration may be signaled in an RRC configuration message.

As shown by reference number 510, the UE 120 may determine that the one or more first REs (e.g., of the UE-specific PUCCH) collide with one or more second REs scheduled for the UE 120 on an uplink data channel (e.g., a PUSCH), in a similar manner as described above in connection with FIG. 4. If the UE 120 determines that there is a collision, then the UE 120 may determine that the two sets of REs collide, and may employ one or more collision avoidance techniques, as described below.

As shown by reference number 515, the UE 120 may perform a collision avoidance technique to prevent collision of an uplink data transmission and an uplink control transmission based at least in part on determining that the one or more first REs collide with the one or more second REs. For example, the UE 120 may prevent a collision by deferring the uplink data transmission, by multiplexing UCI in the uplink data transmission, and/or the like. In some aspects, the uplink data transmission may include an initial uplink data transmission and/or one or more repetitions of the initial uplink data transmission.

As shown by reference number 520, in some aspects, the UE 120 may defer the uplink data transmission to avoid transmitting uplink data in the one or more first REs used for the UE-specific PUCCH. In this way, the UE 120 may transmit UCI (e.g., an ACK or a NACK to a downlink data communication, CSI, an SR, and/or the like) to the base station 110 using the one or more first REs scheduled for the UE-specific PUCCH. In some aspects, the UE 120 may defer the uplink data transmission within a data segment of a frame, in a similar manner as described above in connection with FIG. 4. For example, the UE 120 may defer the uplink data transmission if the UE 120 determines that there are sufficient remaining uplink segments (e.g., a threshold number of remaining uplink subframes), within a data segment, to permit transmission of the uplink data within the data segment. In some aspects, the UE 120 may account for uplink limitations (e.g., a limit on contiguous uplink transmissions, a required transmission gap, and/or the like) when determining whether there are sufficient remaining uplink segments, within the data segment, for transmission of the uplink data. In this way, the UE 120 may prevent transmission of the uplink data from being delayed to a subsequent frame.

As shown by reference number 525, in some aspects, the UE 120 may multiplex UCI on the one or more second REs of the uplink data channel (e.g., the PUSCH, shown as UL-SCH), and may transmit the multiplexed UCI via the uplink data channel. In this case, the UE 120 may drop the uplink control channel (e.g., the PUCCH) to avoid a collision. In some aspects, the UE 120 may multiplex the UCI on the uplink data channel based at least in part on a determination that there are not sufficient remaining uplink segments (e.g., a threshold number of remaining uplink subframes), within a data segment, to permit transmission of the uplink data within the data segment, in a similar manner as described above. For example, the UE 120 may defer the uplink data transmission when a number of subsequent uplink segments (e.g., that occur after the one or more second REs) in a data segment or a frame satisfies a threshold (e.g., is greater than or equal to a threshold), and may multiplex the UCI on the uplink data channel when a number of subsequent uplink segments in the data segment or the frame does not satisfy a threshold (e.g., is less than or equal to a threshold). In this way, the UE 120 may avoid delaying transmission of the uplink data, and may increase the efficiency of network resource usage.

In some aspects, the UE 120 may receive, from the base station 110, an indication of whether to defer the uplink data transmission or multiplex the UCI on the uplink data channel to avoid a collision. For example, the base station 110 may determine whether the base station 110 will be able to schedule the uplink data transmission in one or more subsequent uplink subframes of the same data segment, and may signal a collision avoidance technique to be used by the UE 120 based at least in part on this determination, in a similar manner as described above in connection with FIG. 4. In some aspects, the UE 120 may defer the uplink data transmission within the data segment based at least in part on receiving an indication to defer the uplink data transmission and/or an indication that multiplexing of the UCI on the uplink data channel is to be disabled. Additionally, or alternatively, the UE 120 may multiplex the UCI on the uplink data channel based at least in part on receiving an indication not to defer the uplink data transmission and/or an indication that multiplexing of the UCI on the uplink data channel is to be enabled. In this way, a collision avoidance technique may be flexibly configured to account for dynamic network conditions.

In some aspects, when the UE 120 multiplexes the UCI on the uplink data channel, the UE 120 may rate match or puncture the uplink data transmission to avoid the multiplexed UCI. For example, the UE 120 may rate match the uplink data transmission around the one or more second REs used to transmit the UCI. Additionally, or alternatively, the UE 120 may puncture the uplink data transmission to avoid the one or more second REs used to transmit the UCI. In this way, the UE 120 may avoid delaying transmission of the uplink data, and may increase the efficiency of network resource usage.

In some aspects, the UE 120 may determine a manner in which the UCI is to be multiplexed on the uplink data channel based at least in part on a first number of repetitions configured for the UCI and/or a second number of repetitions configured for the uplink data transmission. For example, the UE 120 may be configured to repeat uplink control transmissions (e.g., UCI) using a first number of repetitions, and/or may be configured to repeat uplink data transmissions using a second number of repetitions. In some aspects, the first number of repetitions and/or the second number of repetitions may be indicated in downlink control information (DCI) (e.g., an uplink grant), an RRC configuration message, a SIB, and/or the like.

In some aspects, the UE 120 may compare the first number of repetitions for the UCI and the second number of repetitions for the uplink data transmission, and may configure UCI multiplexing on the uplink data channel based at least in part on the comparison. In some aspects, if the first number is less than or equal to the second number, then the UE 120 may multiplex and transmit the UCI on a number of subframes equal to the first number. For example, in FIG. 5, the UCI is configured for two repetitions and the uplink data is configured for five repetitions. In this case, the UCI is multiplexed and transmitted two times (e.g., in subframes 0 and 1).

In some aspects, if the first number is greater than the second number, then the UE 120 may increase a beta factor that controls a number of REs used for the UCI (e.g., a beta factor $B_{offset}^{PUSCH}$). For example, the UE 120 may scale the beta factor by a factor equal to the first number divided by the second number. In this way, the UE 120 may allow more resources for reliable transmission of the UCI.

As indicated above, FIG. 5 is provided as an example. Other examples are possible and may differ from what was described with respect to FIG. 5.

Figure 6:
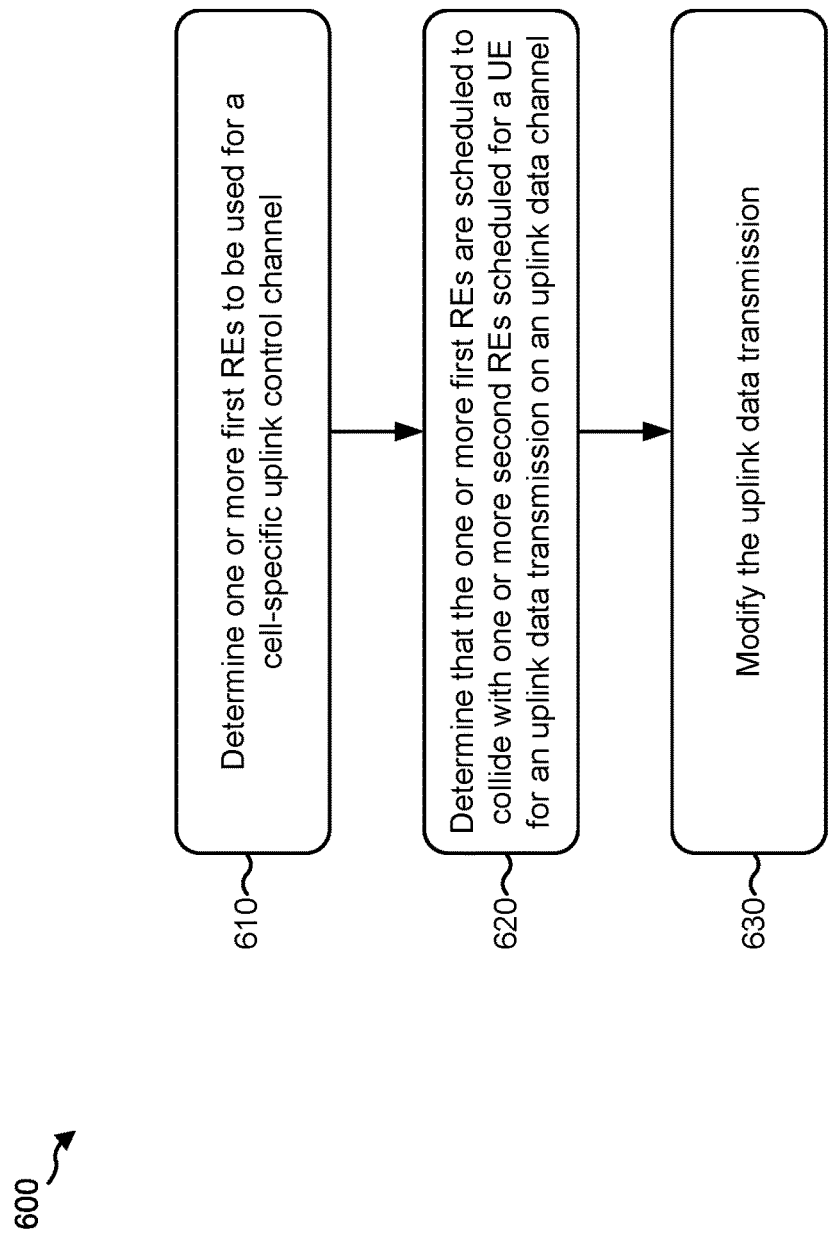
FIGS. 6 and 7 are flow charts of a method of wireless communication.

FIG. 6 is a flow chart of a method 600 of wireless communication. The method may be performed by a UE (e.g., the UE 120 of FIG. 1, the apparatus 802/802' of FIG. 8 and/or FIG. 9, and/or the like).

At 610, the UE may determine one or more first REs to be used for a cell-specific uplink control channel. For example, the UE may determine (e.g., using controller/processor 280 and/or the like) one or more first REs to be used for a cell-specific uplink control channel (e.g., a cell-specific PUCCH), as described above in connection with FIG. 4. In some aspects, the cell-specific uplink control channel is associated with acknowledging or negatively acknowledging initial network setup messages in an unlicensed radio frequency spectrum band.

At 620, the UE may determine that the one or more first REs are scheduled to collide with one or more second REs scheduled for the UE for an uplink data transmission on an uplink data channel. For example, the UE may determine (e.g., using controller/processor 280 and/or the like) the one or more first REs, to be used for the cell-specific uplink control channel, are scheduled to collide with one or more second REs scheduled for the UE for an uplink data transmission on an uplink data channel (e.g., a PUSCH), as described above in connection with FIG. 4. In some aspects, the uplink data transmission includes an initial uplink data transmission and one or more repetitions of the initial uplink data transmission.

At 630, the UE may modify the uplink data transmission. For example, the UE may modify (e.g., using controller/processor 280, transmit processor 264, TX MIMO processor 266, MOD 254, antenna 252, and/or the like) the uplink data transmission based at least in part on determining that the one or more first resource elements are scheduled to collide with the one or more second resource elements, as described above in connection with FIG. 4.

Method 600 may include additional aspects, such as any single aspect or any combination of aspects described below.

In some aspects, modifying the uplink data transmission comprises deferring the uplink data transmission. In some aspects, the uplink data transmission is deferred based at least in part on receiving an indication that the uplink data transmission is to be deferred. In some aspects, the uplink data transmission is deferred within a data segment or a frame in which the one or more second resource elements are scheduled based at least in part on a determination that a number of subsequent uplink segments in the data segment or the frame satisfies a threshold, wherein the subsequent uplink segments are subsequent to the one or more second resource elements.

In some aspects, modifying the uplink data transmission comprises rate matching or puncturing the uplink data transmission to avoid the one or more first resource elements. In some aspects, the uplink data transmission is rate matched or punctured based at least in part on receiving an indication that the uplink data transmission is to be rate matched or punctured. In some aspects, the uplink data transmission is rate matched or punctured based at least in part on a determination that a number of subsequent uplink segments in a data segment or a frame, in which the one or more second resource elements are scheduled, does not satisfy a threshold, wherein the subsequent uplink segments are subsequent to the one or more second resource elements.

In some aspects, the one or more first resource elements of the cell-specific uplink control channel are signaled in a system information block. In some aspects, the UE is a machine-type communication device that operates in the unlicensed radio frequency spectrum band.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
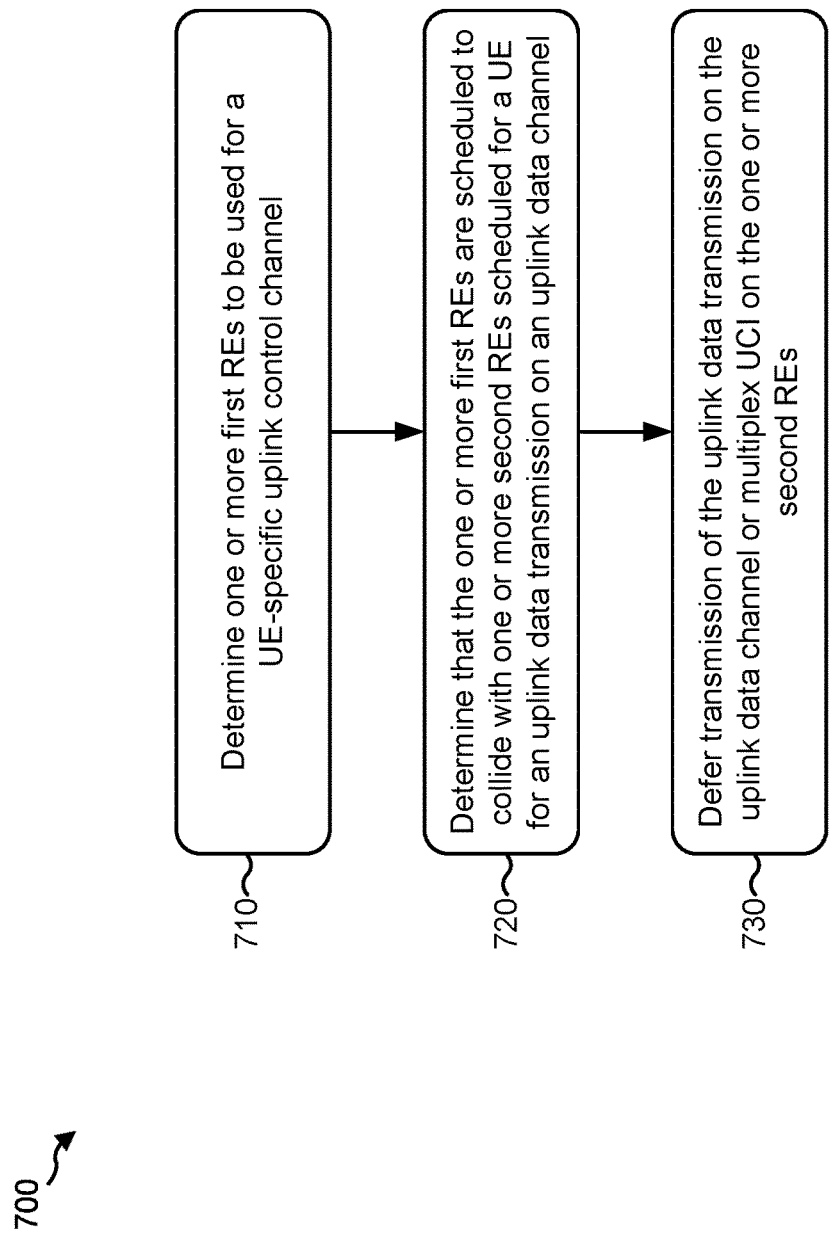

FIG. 7 is a flow chart of a method 700 of wireless communication. The method may be performed by a UE (e.g., the UE 120 of FIG. 1, the apparatus 802/802' of FIG. 8 and/or FIG. 9, and/or the like).

At 710, the UE may determine one or more first REs to be used for a UE-specific uplink control channel. For example, the UE may determine (e.g., using controller/processor 280 and/or the like) one or more first REs to be used for a UE-specific uplink control channel (e.g., a UE-specific PUCCH), as described above in connection with FIG. 5. In some aspects, the UE-specific uplink control channel is associated with acknowledging or negatively acknowledging, by the UE, downlink data communications in an unlicensed radio frequency spectrum band.

At 720, the UE may determine that the one or more first REs are scheduled to collide with one or more second REs scheduled for the UE for an uplink data transmission on an uplink data channel. For example, the UE may determine (e.g., using controller/processor 280 and/or the like) that the one or more first REs are scheduled to collide with one or more second REs scheduled for the UE for an uplink data transmission on an uplink data channel (e.g., a PUSCH), as described above in connection with FIG. 5. In some aspects, the uplink data transmission includes an initial uplink data transmission and one or more repetitions of the initial uplink data transmission.

At 730, the UE may defer transmission of the uplink data transmission on the uplink data channel or multiplex UCI on the one or more second REs of the uplink data channel. For example, the UE may defer transmission (e.g., using controller/processor 280, transmit processor 264, TX MIMO processor 266, MOD 254, antenna 252, and/or the like) of the uplink data transmission on the uplink data channel or may multiplex (e.g., using controller/processor 280, transmit processor 264, TX MIMO processor 266, MOD 254, antenna 252, and/or the like) UCI on the one or more second REs of the uplink data channel based at least in part on determining that the one or more first REs are scheduled to collide with the one or more second REs, as described above in connection with FIG. 5.

Method 700 may include additional aspects, such as any single aspect or any combination of aspects described below.

In some aspects, the uplink data transmission is deferred based at least in part on receiving an indication that multiplexing of the UCI on the uplink data channel is to be disabled. In some aspects, the UCI is multiplexed on the one or more second resource elements of the uplink data channel based at least in part on receiving an indication that multiplexing of the UCI on the uplink data channel is to be enabled. In some aspects, the uplink data transmission is rate matched or punctured around the one or more second resource elements on which the UCI is multiplexed.

In some aspects, the UCI is multiplexed on the one or more second resource elements of the uplink data channel based at least in part on a first number of repetitions configured for the UCI and a second number of repetitions configured for the uplink data transmission. In some aspects, the UCI is transmitted on a number of subframes equal to the first number when the first number is less than or equal to the second number. In some aspects, a beta factor, that controls a number of resource elements used for the UCI, is adjusted when the first number is greater than the second number. In some aspects, the beta factor is scaled by a factor equal to the first number divided by the second number.

In some aspects, the one or more first resource elements of the UE-specific uplink control channel are signaled in a radio resource control configuration message. In some aspects, the UE is a machine-type communication device that operates in an unlicensed radio frequency spectrum band.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
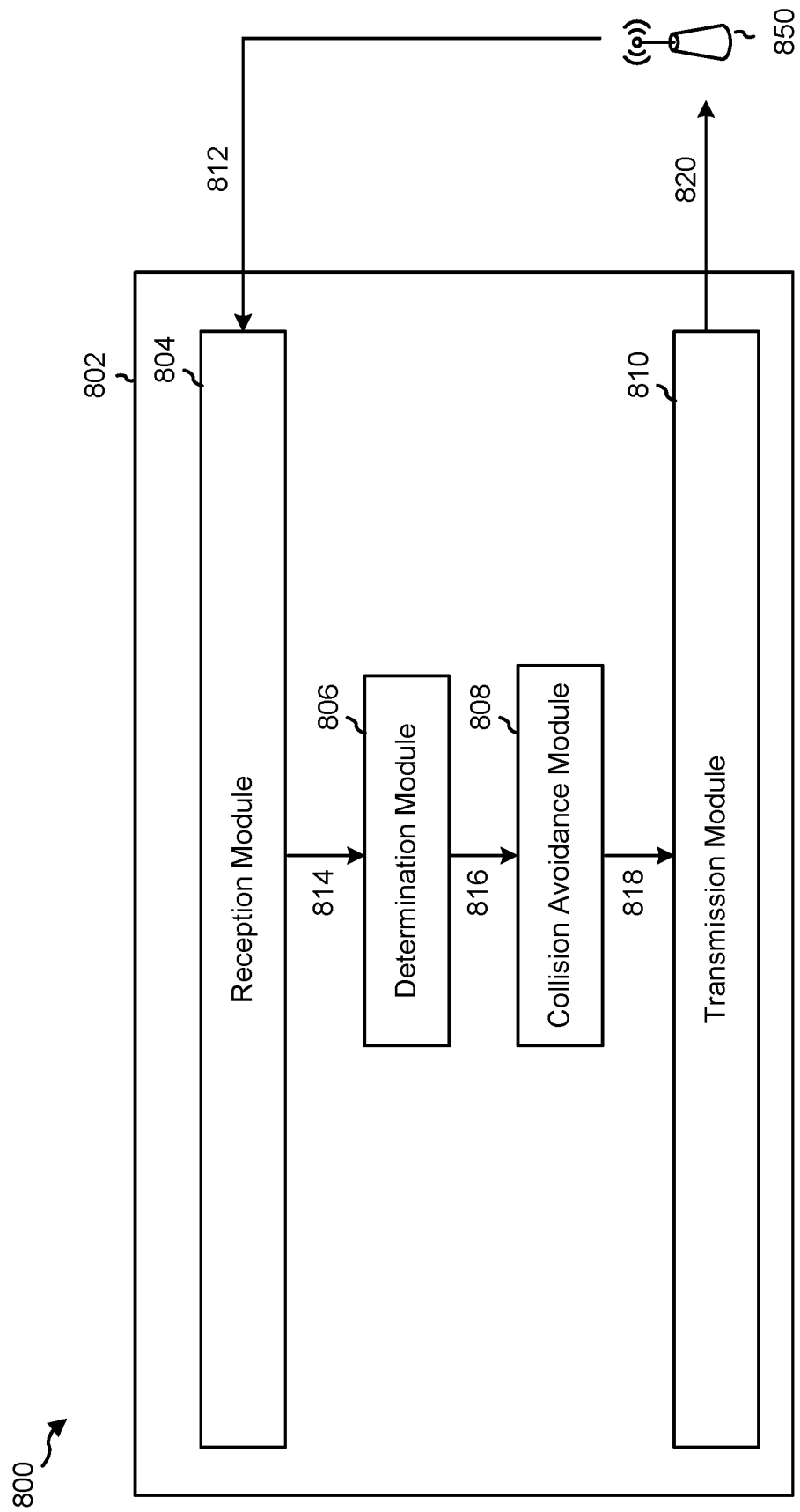
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a UE. In some aspects, the apparatus 802 includes a reception module 804, a determination module 806, a collision avoidance module 808, a transmission module 810, and/or the like.

In some aspects, the reception module 804 may receive information 812, from an apparatus 850 (e.g., a base station), that indicates one or more first REs to be used for a cell-specific uplink control channel and/or a UE-specific uplink control channel. Additionally, or alternatively, the reception module may receive information 812, from the apparatus 850, indicating one or more second REs scheduled for the apparatus 802 on an uplink data channel. The reception module 804 may provide information identifying the one or more first REs and/or the one or more second REs to the determination module 806 as information 814. The determination module 806 may determine the one or more first REs and/or the one or more second REs using the information 814, and may determine that the one or more first REs collide with one or more second REs. The determination module 806 may provide an indication of the collision to the collision avoidance module 808 as information 816.

The collision avoidance module 808 may perform one or more collision avoidance techniques to prevent the collision (e.g., to prevent transmission of an uplink data transmission suing the one or more first REs). For example, the collision avoidance module 808 may defer the uplink data transmission, in which case the collision avoidance module 808 may provide an instruction as information 818 to the transmission module 810 instruction to defer transmission. In this case, the transmission module 810 may defer the uplink data transmission, and may transmit the uplink data as information 820 to the apparatus 850 at a later time. As another example, the collision avoidance module 808 may rate match or puncture the uplink data transmission to avoid the one or more first REs, and may provide the rate matched or punctured uplink data transmission to the transmission module 810 as information 818. In this case, the transmission module 810 may transmit the rate matched or punctured uplink data transmission to the apparatus 850 as information 820. As another example, the collision avoidance module 808 may multiplex UCI on the one or more second REs of the uplink data channel. In this case, the transmission module 810 may transmit the multiplexed UCI to the apparatus 850 on the uplink data channel as information 820.

The apparatus may include additional modules that perform each of the blocks of the algorithm in the aforementioned method 600 of FIG. 6, method 700 of FIG. 7, and/or the like. As such, each block in the aforementioned method 600 of FIG. 6, method 700 of FIG. 7, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
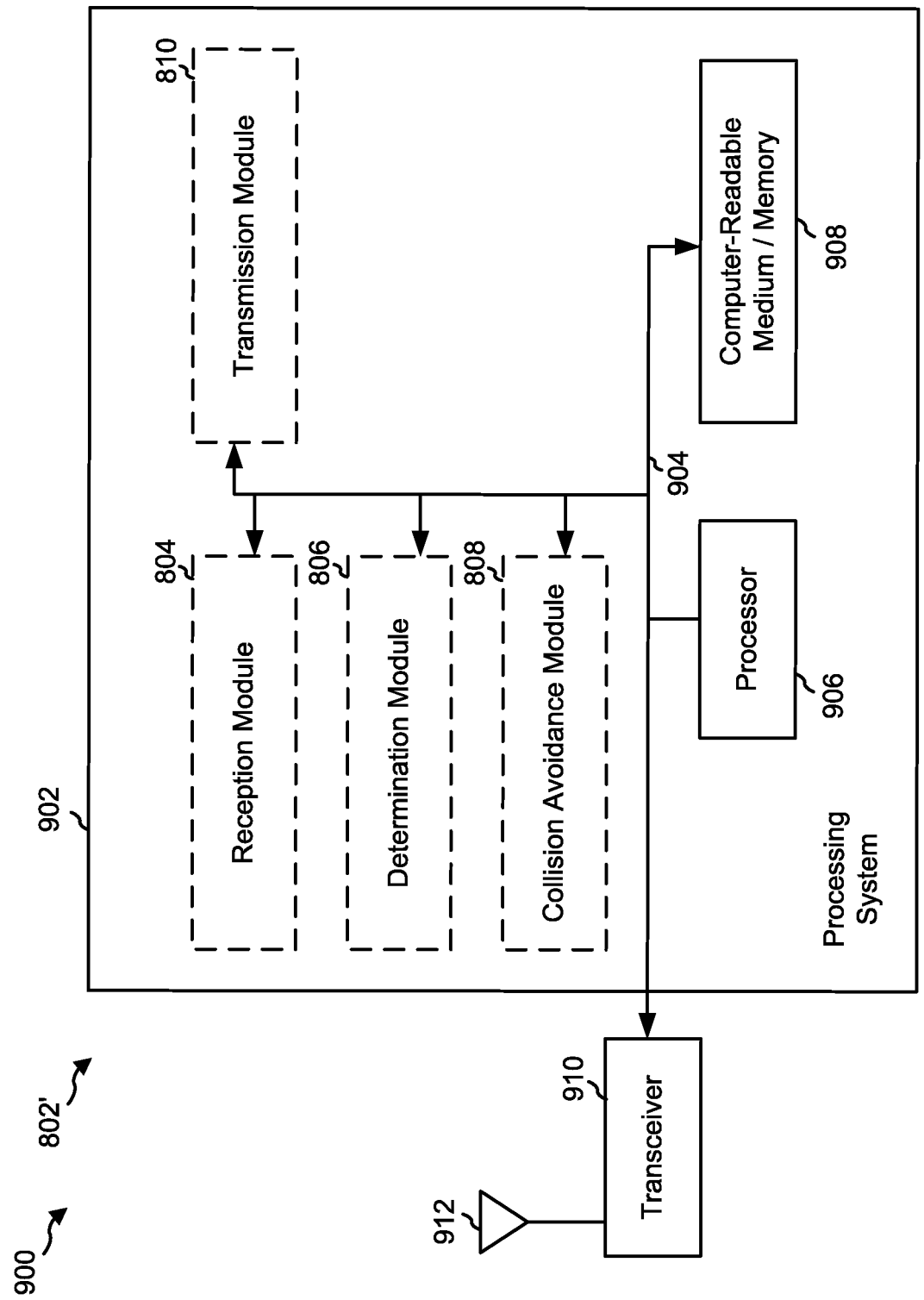
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a UE.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, and/or 810, and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 810, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described supra for any particular apparatus. The computer-readable medium/memory 908 may also be used for storing data that is manipulated by the processor 906 when executing software. The processing system further includes at least one of the modules 804, 806, 808, and/or 810. The modules may be software modules running in the processor 906, resident/stored in the computer readable medium/memory 908, one or more hardware modules coupled to the processor 906, or some combination thereof. The processing system 902 may be a component of the UE 120 and may include the memory 282 and/or at least one of the TX MIMO processor 266, the RX processor 258, and/or the controller/processor 280.

In some aspects, the apparatus 802/802' for wireless communication includes means for determining one or more first resource elements to be used for a cell-specific uplink control channel associated with acknowledging or negatively acknowledging initial network setup messages in an unlicensed radio frequency spectrum band; means for determining that the one or more first resource elements are scheduled to collide with one or more second resource elements scheduled for the apparatus 802/802' for an uplink data transmission on an uplink data channel, wherein the uplink data transmission includes an initial uplink data transmission and one or more repetitions of the initial uplink data transmission; means for modifying the uplink data transmission based at least in part on determining that the one or more first resource elements are scheduled to collide with the one or more second resource elements; and/or the like. Additionally, or alternatively, the apparatus 802/802' for wireless communication may include means for determining one or more first resource elements to be used for a UE-specific uplink control channel associated with acknowledging or negatively acknowledging, by the apparatus 802/802', downlink data communications in an unlicensed radio frequency spectrum band; means for determining that the one or more first resource elements are scheduled to collide with one or more second resource elements scheduled for the apparatus 802/802' for an uplink data transmission on an uplink data channel, wherein the uplink data transmission includes an initial uplink data transmission and one or more repetitions of the initial uplink data transmission; means for deferring transmission of the uplink data transmission on the uplink data channel or multiplexing uplink control information (UCI) on the one or more second resource elements of the uplink data channel based at least in part on determining that the one or more first resource elements are scheduled to collide with the one or more second resource elements; and/or the like. The aforementioned means may be one or more of the aforementioned modules of the apparatus 802 and/or the processing system 902 of the apparatus 802' configured to perform the functions recited by the aforementioned means. As described supra, the processing system 902 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 9 is provided as an example. Other examples are possible and may differ from what was described in connection with FIG. 9.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
    determining one or more first resource elements to be used for a UE-specific uplink control channel associated with acknowledging or negatively acknowledging, by the UE, downlink data communications;
    determining that the one or more first resource elements are scheduled to collide with one or more second resource elements scheduled for the UE for an uplink data transmission on an uplink data channel, wherein the uplink data transmission includes an initial uplink data transmission and one or more repetitions of the initial uplink data transmission; and
    multiplexing uplink control information (UCI) on the one or more second resource elements of the uplink data channel based at least in part on determining that the one or more first resource elements are scheduled to collide with the one or more second resource elements, wherein a number of resource elements used for transmitting the UCI is based on a beta factor;
    wherein, when a first number of repetitions configured for the UCI is less than a second number of repetitions configured for the uplink data transmission, the UCI is multiplexed on the one or more second resource elements of the uplink data channel without adjusting the beta factor; and
    wherein, when the first number of repetitions configured for the UCI is greater than the second number of repetitions configured for the uplink data transmission, the UCI is multiplexed on the one or more second resource elements of the uplink data channel based on an adjusted beta factor.

2. The method of claim 1, wherein the UCI is multiplexed on the one or more second resource elements of the uplink data channel based at least in part on receiving an indication that multiplexing of the UCI on the uplink data channel is to be enabled.

3. The method of claim 1, wherein the uplink data transmission is rate matched or punctured around the one or more second resource elements on which the UCI is multiplexed.

4. The method of claim 1, wherein the UCI is transmitted on a number of subframes equal to the first number when the first number is less than the second number.

5. The method of claim 1, wherein the one or more first resource elements of the UE-specific uplink control channel are signaled in a radio resource control configuration message.

6. The method of claim 1, wherein the UE is a machine-type communication device that operates in an unlicensed radio frequency spectrum band.

7. The method of claim 1, wherein the UCI includes at least one of acknowledgment information or channel state information (CSI).

8. A user equipment (UE) for wireless communication, comprising:
    one or more memories; and one or more processors coupled to the one or more memories, the one or more processors configured to:
- determine one or more first resource elements to be used for a UE-specific uplink control channel associated with acknowledging or negatively acknowledging, by the UE, downlink data communications;
- determine that the one or more first resource elements are scheduled to collide with one or more second resource elements scheduled for the UE for an uplink data transmission on an uplink data channel, wherein the uplink data transmission includes an initial uplink data transmission and one or more repetitions of the initial uplink data transmission; and
- multiplex uplink control information (UCI) on the one or more second resource elements of the uplink data channel based at least in part on the one or more first resource elements being determined to be scheduled to collide with the one or more second resource elements;
- wherein a number of resource elements used for transmitting the UCI is based on a beta factor;
- wherein, when a first number of repetitions configured for the UCI is less than a second number of repetitions configured for the uplink data transmission, the UCI is multiplexed on the one or more second resource elements of the uplink data channel without adjusting the beta factor; and
- wherein, when the first number of repetitions configured for the UCI is greater than the second number of repetitions configured for the uplink data transmission, the UCI is multiplexed on the one or more second resource elements of the uplink data channel based on an adjusted beta factor.

9. The UE of claim 8, wherein the one or more processors, to multiplex the UCI on the one or more second resource elements of the uplink data channel, are configured to:
multiplex the UCI on the one or more second resource elements of the uplink data channel based at least in part on an indication that multiplexing of the UCI on the uplink data channel is to be enabled.

10. The UE of claim 8, wherein the one or more processors are further configured to:
rate match or puncture the uplink data transmission around the one or more second resource elements on which the UCI is multiplexed.

11. The UE of claim 8, wherein the one or more processors are further configured to:
transmit the UCI on a number of subframes equal to the first number when the first number is less than or equal to the second number.

12. The UE of claim 8, wherein the UCI includes at least one of acknowledgment information or channel state information (CSI).

13. The UE of claim 8, wherein the one or more processors are further configured to:
signal the one or more first resource elements of the UE-specific uplink control channel in a radio resource control configuration message.

14. The UE of claim 8, wherein the UE is a machine-type communication device that operates in an unlicensed radio frequency spectrum band.

15. The UE of claim 8, wherein the one or more processors, to adjust the beta factor, is configured to:
scale the beta factor by a factor equal to the first number divided by the second number.

16. A non-transitory computer-readable medium storing instructions for wireless communication, the instructions comprising:
one or more instructions that, when executed by one or more processors of a user equipment (UE), cause the UE to:
- determine one or more first resource elements to be used for a UE-specific uplink control channel associated with acknowledging or negatively acknowledging, by the UE, downlink data communications;
- determine that the one or more first resource elements are scheduled to collide with one or more second resource elements scheduled for the UE for an uplink data transmission on an uplink data channel, wherein the uplink data transmission includes an initial uplink data transmission and one or more repetitions of the initial uplink data transmission; and
- multiplex uplink control information (UCI) on the one or more second resource elements of the uplink data channel based at least in part on the one or more first resource elements being determined to be scheduled to collide with the one or more second resource elements;
- wherein a number of resource elements used for transmitting the UCI is based on a beta factor;
- wherein, when a first number of repetitions configured for the UCI is less than a second number of repetitions configured for the uplink data transmission, the UCI is multiplexed on the one or more second resource elements of the uplink data channel without adjusting the beta factor; and
- wherein, when the first number of repetitions configured for the UCI is greater than the second number of repetitions configured for the uplink data transmission, the UCI is multiplexed on the one or more second resource elements of the uplink data channel based on an adjusted beta factor.

17. The non-transitory computer-readable medium of claim 16, wherein the one or more instructions, that cause the UE to multiplex the UCI on the one or more second resource elements of the uplink data channel, cause the UE to:
multiplex the UCI on the one or more second resource elements of the uplink data channel based at least in part on an indication that multiplexing of the UCI on the uplink data channel is to be enabled.

18. The non-transitory computer-readable medium of claim 16, wherein the one or more instructions further cause the UE to:
rate match or puncture the uplink data transmission around the one or more second resource elements on which the UCI is multiplexed.

19. The non-transitory computer-readable medium of claim 16, wherein the one or more instructions further cause the UE to:
transmit the UCI on a number of subframes equal to the first number when the first number is less than or equal to the second number.

20. The non-transitory computer-readable medium of claim 16, wherein the UCI includes at least one of acknowledgment information or channel state information (CSI).

21. The non-transitory computer-readable medium of claim 16, wherein the one or more instructions further cause the UE to: signal the one or more first resource elements of the UE-specific uplink control channel in a radio resource control configuration message.

22. The non-transitory computer-readable medium of claim 16, wherein the UE is a machine-type communication device that operates in an unlicensed radio frequency spectrum band.

23. An apparatus for wireless communication, comprising:
- means for determining one or more first resource elements to be used for an apparatus-specific uplink control channel associated with acknowledging or negatively acknowledging, by the apparatus, downlink data communications;
- means for determining that the one or more first resource elements are scheduled to collide with one or more second resource elements scheduled for the apparatus for an uplink data transmission on an uplink data channel, wherein the uplink data transmission includes an initial uplink data transmission and one or more repetitions of the initial uplink data transmission; and
- means for multiplexing uplink control information (UCI) on the one or more second resource elements of the uplink data channel based at least in part on determining that the one or more first resource elements are scheduled to collide with the one or more second resource elements;
- wherein a number of resource elements used for transmitting the UCI is based on a beta factor;
- wherein, when a first number of repetitions configured for the UCI is less than a second number of repetitions configured for the uplink data transmission, the UCI is multiplexed on the one or more second resource elements of the uplink data channel without adjusting the beta factor; and
- wherein, when the first number of repetitions configured for the UCI is greater than the second number of repetitions configured for the uplink data transmission, the UCI is multiplexed on the one or more second resource elements of the uplink data channel based on an adjusted beta factor.

24. The apparatus of claim 23, wherein the means for multiplexing the UCI on the one or more second resource elements of the uplink data channel comprises:
- means for multiplexing the UCI on the one or more second resource elements of the uplink data channel based at least in part on receiving an indication that multiplexing of the UCI on the uplink data channel is to be enabled.

25. The apparatus of claim 23, further comprising:
- means for rate matching or puncturing the uplink data transmission around the one or more second resource elements on which the UCI is multiplexed.

26. The apparatus of claim 23, further comprising:
- means for transmitting the UCI on a number of subframes equal to the first number when the first number is less than or equal to the second number.

27. The apparatus of claim 23, wherein the UCI includes at least one of acknowledgment information or channel state information (CSI).

28. The apparatus of claim 23, further comprising:
- means for signaling the one or more first resource elements of the apparatus-specific uplink control channel in a radio resource control configuration message.

29. The apparatus of claim 23, wherein the apparatus is a machine-type communication device that operates in an unlicensed radio frequency spectrum band.

* * * * *